United States Patent
Yao et al.

(10) Patent No.: US 12,032,185 B2
(45) Date of Patent: Jul. 9, 2024

(54) COLOR FILTER SUBSTRATE, METHOD OF MANUFACTURING THE SAME, AND DISPLAY PANEL

(71) Applicants: Hefei Xinsheng Optoelectronics Technology Co., Ltd., Anhui (CN); BOE Technology Group Co., Ltd., Beijing (CN)

(72) Inventors: Chengpeng Yao, Beijing (CN); Lei Guo, Beijing (CN); Zhendong Li, Beijing (CN); Wei Zhang, Beijing (CN); Xia Shi, Beijing (CN); Jiaqing Liu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 665 days.

(21) Appl. No.: 17/289,331

(22) PCT Filed: May 20, 2020

(86) PCT No.: PCT/CN2020/091279
§ 371 (c)(1),
(2) Date: Apr. 28, 2021

(87) PCT Pub. No.: WO2020/233594
PCT Pub. Date: Nov. 26, 2020

(65) Prior Publication Data
US 2022/0019008 A1    Jan. 20, 2022

(30) Foreign Application Priority Data

May 23, 2019 (CN) .......................... 201910435794.7

(51) Int. Cl.
G02B 5/28 (2006.01)
F21V 8/00 (2006.01)
G02B 1/04 (2006.01)

(52) U.S. Cl.
CPC ............... *G02B 5/28* (2013.01); *G02B 1/045* (2013.01); *G02B 6/0043* (2013.01); *G02B 6/0065* (2013.01); *G02B 2207/101* (2013.01)

(58) Field of Classification Search
CPC ........ G02B 5/28; G02B 1/045; G02B 6/0043; G02B 6/0065; G02B 2207/101
(Continued)

(56) References Cited

U.S. PATENT DOCUMENTS

2011/0116010 A1* 5/2011 Nagata .................. G02B 6/005
349/62
2014/0268332 A1 9/2014 Guo et al.
(Continued)

FOREIGN PATENT DOCUMENTS

CN  102103224 A  6/2011
CN  103048715 A  4/2013
(Continued)

*Primary Examiner* — Sharrief I Broome
(74) *Attorney, Agent, or Firm* — Nath, Goldberg & Meyer; Joshua B. Goldberg

(57) ABSTRACT

A color filter (CF) substrate includes a CF structure disposed on a base, and multiple pixel regions each including multiple sub-pixel regions. The CF structure includes a nanostructure layer including multiple nanostructures and a light guide structure layer including multiple light guide structures, sequentially provided on the base. Each light guide structure is in a corresponding pixel region, and includes multiple light guide sub-portions. Each light guide sub-portion is in a corresponding sub-pixel region. Each sub-pixel region corresponds to a nanostructure, and each nanostructure is in a corresponding sub-pixel region. Each of the light guide sub-portions in one pixel region is configured such that light (Continued)

incident on the light guide sub-portions exits at different angles and enters into the nanostructure in the sub-pixel region corresponding thereto. Each nanostructure is configured such that light exiting from the sub-pixel region corresponding thereto has a predetermined color.

20 Claims, 11 Drawing Sheets

(58) Field of Classification Search
USPC .......................................................... 359/577
See application file for complete search history.

(56) References Cited

U.S. PATENT DOCUMENTS

| | | | | |
|---|---|---|---|---|
| 2014/0353627 | A1* | 12/2014 | Park | ................ H10K 59/80523 438/34 |
| 2015/0129851 | A1* | 5/2015 | Lee | ....................... H10K 59/12 257/40 |
| 2017/0235188 | A1 | 8/2017 | Large | |
| 2018/0277523 | A1* | 9/2018 | Ahmed | ................. H01L 27/156 |
| 2018/0284509 | A1 | 10/2018 | Chanda et al. | |
| 2019/0113727 | A1* | 4/2019 | Tamma | .................... H01L 33/58 |
| 2021/0356726 | A1* | 11/2021 | Tamma | ................. F21V 7/0008 |

FOREIGN PATENT DOCUMENTS

| | | |
|---|---|---|
| CN | 105259600 A | 1/2016 |
| CN | 107238968 A | 10/2017 |
| CN | 206610052 U | 11/2017 |
| CN | 110082950 A | 8/2019 |
| KR | 20130016157 A | 2/2013 |
| KR | 20140069879 A | 6/2014 |
| KR | 20140086934 A | 7/2014 |
| KR | 101635603 B1 | 7/2016 |
| TW | 201024806 A | 7/2010 |
| WO | 2008100051 A1 | 8/2008 |
| WO | 2019068304 A1 | 4/2019 |

* cited by examiner

COLOR FILTER SUBSTRATE, METHOD OF MANUFACTURING THE SAME, AND DISPLAY PANEL

CROSS-REFERENCE TO RELATED APPLICATION

This is a National Phase Application filed under 35 U.S.C. 371 as a national stage of PCT/CN2020/091279, filed on May 20, 2020, an application claiming priority to Chinese patent application No. 201910435794.7 filed on May 23, 2019, the entirety of each of which is incorporated herein by reference.

TECHNICAL FIELD

The present disclosure relates to the field of display technologies, in particular, to a color filter substrate, a method of manufacturing the same, and a display panel.

BACKGROUND

A color filter (CF) substrate is one of the key components for manufacturing a thin film transistor liquid crystal display (TFT-LCD) panel. The CF substrate enables light transmitted through the liquid crystal molecules to display different colors after passing through the filters with different colors, and then a color pattern can be displayed by the combination of the light with different colors.

Generally, the color filter substrate implements a color filtering function for light by employing a color filter material for a specific color (e.g., red, green, or blue). The greater the thickness of the color filter material is, the purer the color of the obtained monochromatic light is and the higher the color gamut of the liquid crystal display is. However, the transmittance of the light may be sacrificed. In addition, the color filter material includes organic resin and pigment in which ionic impurities may be formed, and a direct current (DC) bias electric field may be produced by the ionic impurities being diffused to the surface of the alignment film and subjected to a bias voltage inside the display panel, so that display afterimage of the display panel may be aggravated.

SUMMARY

According to embodiments of the present disclosure, a color filter substrate includes a base, and a color filter structure disposed on a side of the base. The color filter substrate includes a plurality of pixel regions, and each of the plurality of pixel regions includes a plurality of sub-pixel regions; the color filter structure includes a nanostructure layer and a light guide structure layer, the light guide structure layer is disposed on a side of the nanostructure layer distal to the base, the light guide structure layer includes a plurality of light guide structures, each of the plurality of light guide structures is located in a corresponding one of the plurality of pixel regions, each of the plurality of light guide structures includes a plurality of light guide sub-portions, each of the plurality of light guide sub-portions is located in a corresponding one of the plurality of sub-pixel regions of the pixel region in which the light guide sub-portion is located, the nanostructure layer includes a plurality of non-periodic nanostructures, each of the plurality of sub-pixel regions corresponds to at least one of the non-periodic nanostructures, and each of the plurality of non-periodic nanostructures is located in a corresponding one of the plurality of sub-pixel regions; and each of the plurality of light guide sub-portions in a same pixel region is configured such that light incident respectively on the plurality of light guide sub-portions in the same pixel region exits at different angles and enters into the at least one non-periodic nanostructure in the sub-pixel region in which the light guide sub-portion is located, and each non-periodic nanostructure is configured to enable coupling and interference of light incident thereon such that light exiting from the sub-pixel region in which the non-periodic nanostructure is located has a predetermined color.

In some embodiments, each non-periodic nanostructure includes: a plurality of grooves provided in the non-periodic nanostructure and recessed from a surface of the non-periodic nanostructure distal to the base and arranged in a first direction parallel to the surface of the non-periodic nanostructure, and a slit penetrating the non-periodic nanostructure in a third direction perpendicular to the surface of the non-periodic nanostructure, each groove being recessed from the surface of the non-periodic nanostructure in the third direction by a depth less than a thickness of the non-periodic nanostructure in the third direction. In each non-periodic nanostructure, widths of the plurality of grooves in the first direction are non-periodic and pitches of the plurality of grooves in the first direction are non-periodic.

In some embodiments, in each non-periodic nanostructure, the widths of the plurality of grooves in the first direction are different from each other, the pitches of the plurality of grooves in the first direction are different from each other, and the width of each of the plurality of grooves in the first direction is different from a width of the slit in the first direction.

In some embodiments, in each non-periodic nanostructure, the plurality of grooves and the slit extend parallel to each other in a second direction parallel to the surface of the non-periodic nanostructure and intersecting the first direction, and lengths of the plurality of grooves and the slit in the second direction are equal to a size of the non-periodic nanostructure in the second direction.

In some embodiments, in each non-periodic nanostructure, the plurality of grooves have a same depth in the third direction.

In some embodiments, in any two non-periodic nanostructures of the plurality of non-periodic nanostructures, pitches of the plurality of grooves in the first direction are different from each other, widths of the plurality of grooves in the first direction are different from each other, and the slits of the two non-periodic nanostructures have a same width in the first direction.

In some embodiments, in each non-periodic nanostructure, the non-periodic nanostructure has a width of 5 μm in the first direction.

In some embodiments, in each non-periodic nanostructure, the width of each of the plurality of grooves in the first direction is in a range from 50 nm to 400 nm, and the depth of each of the plurality of grooves in the third direction is 100 nm.

In some embodiments, in each non-periodic nanostructure, a width of the slit in the first direction is 100 nm.

In some embodiments, the plurality of sub-pixel regions in each pixel region are arranged in the first direction, and the plurality of non-periodic nanostructures are arranged in the first direction.

In some embodiments, a width of one sub-pixel region in the first direction is 1 or n times a width of one non-periodic nanostructure in the first direction, n being greater than or equal to 2 and less than or equal to 500.

In some embodiments, the plurality of sub-pixel regions of the plurality of pixel regions are arranged in an array, and a size of the plurality of non-periodic nanostructures in the second direction is equal to a size of the array of the plurality of sub-pixel regions of the plurality of pixel regions in the second direction.

In some embodiments, a transparent conductive layer is disposed between the base and the nanostructure layer, and the nanostructure layer is disposed on a side of the transparent conductive layer distal to the base.

In some embodiments, light exiting surfaces of the plurality of light guide sub-portions of each light guide structure facing the nanostructure layer have different angles with respect to a first surface of the nanostructure layer distal to the base, such that light exiting from the plurality of sub-pixel regions corresponding to the plurality of light guide sub-portions to the outside of the color filter substrate have different colors from each other.

In some embodiments, each pixel region includes a red sub-pixel region, a green sub-pixel region and a blue sub-pixel region; the light guide structure corresponding to the pixel region includes a first light guide sub-portion, a second light guide sub-portion and a third light guide sub-portion, and the first light guide sub-portion, the second light guide sub-portion and the third light guide sub-portion are in the red sub-pixel region, the green sub-pixel region and the blue sub-pixel region, respectively; and an angle between the light exiting surface of the first light guide sub-portion and the first surface is 0°, an acute angle between the light exiting surface of the second light guide sub-portion and the first surface is 19°, and an acute angle between the light exiting surface of the third light guide sub-portion and the first surface is 31.9°.

In some embodiments, the non-periodic nanostructure includes silver.

In some embodiments, the light guide structure includes polymethyl methacrylate.

According to embodiments of the present disclosure, a display panel includes the above color filter substrate, and an array substrate.

According to embodiments of the present disclosure, a method of manufacturing the above color filter substrate includes forming the nanostructure layer and the light guide structure layer on the base. The light guide structure layer is disposed on the side of the nanostructure layer distal to the base.

In some embodiments, forming the nanostructure layer includes: forming a transparent conductive layer on the base; forming a sacrificial layer on the transparent conductive layer; patterning the sacrificial layer to form a sacrificial pattern; forming a first nanostructure layer on the transparent conductive layer and the sacrificial pattern; removing the sacrificial pattern and a portion of the first nanostructure layer on the sacrificial pattern; forming a second nanostructure layer on the transparent conductive layer and a remaining portion of the first nanostructure layer; and forming a slit penetrating the remaining portion of the first nanostructure layer and the second nanostructure layer.

DETAILED DESCRIPTION

To improve understanding of the technical solution of the present disclosure for those skilled in the art, the present disclosure will now be further described in detail below in conjunction with accompanying drawings ad specific embodiments.

Figure 1:
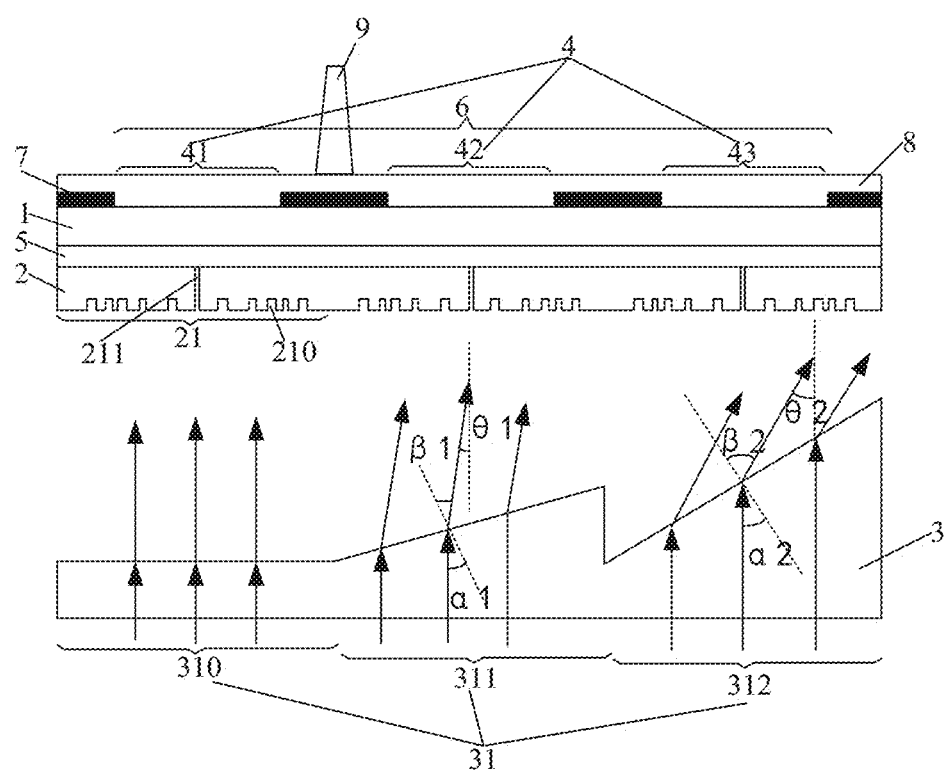
FIG. 1 illustrates a schematic cross-sectional view of a structure of a color filter substrate according to an embodiment of the present disclosure.

FIG. 1 illustrates a schematic cross-sectional view of a structure of a color filter substrate according to an embodiment of the present disclosure.

As shown in FIG. 1, a color filter substrate according to an embodiment of the present disclosure includes a base 1 and a color filter structure disposed on a side of the base 1. As shown in FIG. 1, the color filter structure includes a nanostructure layer 2 and a light guide structure layer 3, and the light guide structure layer 3 is disposed on a side of the nanostructure layer 2 distal to the base 1. The color filter substrate according to the embodiment of the present disclosure includes a plurality of pixel regions 6. As shown in FIG. 1, each of the pixel regions 6 includes a plurality of sub-pixel regions 4. The light guide structure layer 3 may include a plurality of light guide structures 31, and each light guide structure 31 is located in a corresponding one of the plurality of pixel regions 6. In some embodiments, the light guide structure layer 3 includes a plurality of light guide structures 31 in one-to-one correspondence with the plurality of pixel regions 6. As shown in FIG. 1, each light guide structure 31 includes a plurality of light guide sub-portions, and each light guide sub-portion is located in a corresponding one of the plurality of sub-pixel regions 4 of the pixel region 6 in which the light guide sub-portion is located. In some embodiments, each light guide structure 31 is located in the pixel region 6 corresponding thereto, each light guide structure 31 includes a plurality of light guide sub-portions in one-to-one correspondence with the plurality of sub-pixel regions of the pixel region corresponding to the light guide structure 31, and each light guide sub-portion is located in the sub-pixel region 4 corresponding thereto. The nanostructure layer 2 includes a plurality of nanostructures 21, each of the sub-pixel regions 4 corresponds to at least one of the nanostructures 21, and each of the nanostructures 21 is located in the sub-pixel region 4 corresponding thereto. In some embodiments, as shown in FIG. 1, the pixel region 6 includes three sub-pixel regions 41, 42, and 43, and the light guide structure 31 located in the pixel region 6 includes three light guide sub-portions 310, 311, and 312 located in the three sub-pixel regions 41, 42, and 43, respectively.

As shown in FIG. 1, each of the plurality of light guide sub-portions in the same pixel region 6 is configured such that light incident respectively on the plurality of light guide sub-portions in the same pixel region 6 exits at different angles and enters into the at least one nanostructure 21 in the sub-pixel region 4 in which the light guide sub-portion is located, and each nanostructure 21 is configured to enable coupling and interference of light incident thereon such that the light exiting from the sub-pixel region in which the nanostructure 21 is located has a predetermined color.

The color filter substrate according to the embodiment of the present disclosure replaces color filter materials for different colors with the color filter structure including the nanostructure layer 2 and the light guide structure layer 3 to realize color filtering of light, and thus the color gamut can be improved without sacrificing the light transmittance. In addition, the color filter structure does not include ion impurities, so that the display afterimage caused by the direct current bias electric field due to the ion impurities can be eliminated or alleviated.

Figure 2:
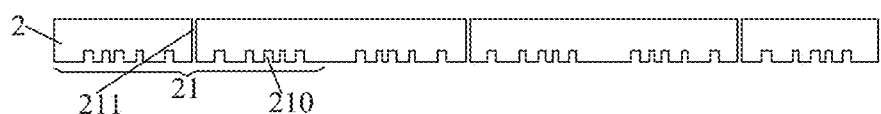
FIG. 2 illustrates a schematic partial cross-sectional view of a nanostructure layer according to an embodiment of the present disclosure.
Figure 3:
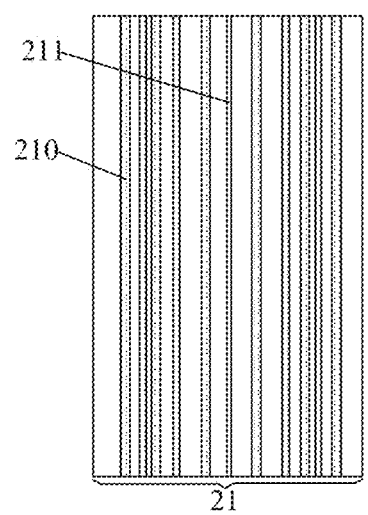
FIG. 3 illustrates a schematic top view of a nanostructure of a nanostructure layer according to an embodiment of the present disclosure.

FIG. 2 illustrates a schematic partial cross-sectional view of a nanostructure layer according to an embodiment of the present disclosure. FIG. 3 illustrates a schematic top view of a nanostructure of a nanostructure layer according to an embodiment of the present disclosure.

As shown in FIGS. 2 and 3, the nanostructure layer 2 includes a plurality of nanostructures 21. Each of the nanostructures 21 includes a plurality of grooves 210 provided in the nanostructure 21 and recessed from a surface 21LS of the nanostructure 21 distal to the base 1 and arranged in a first direction parallel to the surface 21LS, and a slit 211 penetrating the nanostructure 21 in a third direction perpendicular to the surface 21LS. As shown in FIG. 2, depths of the grooves 210 in the third direction are less than a thickness of the nanostructure 21 in the third direction. As shown in FIGS. 2 and 3, in each nanostructure 21, widths of the plurality of grooves 210 in the first direction are non-periodic, and pitches of the plurality of grooves 210 in the first direction are non-periodic. Herein, the term "pitch" refers to a distance between two adjacent grooves.

In some embodiments, in each of the nanostructures 21, the widths of the plurality of grooves 210 in the first direction are different from each other, the pitches of the plurality of grooves 210 in the first direction are different from each other, and the width of each of the plurality of grooves 210 in the first direction is different from a width of the slit 211 in the first direction.

In some embodiments, as shown in FIG. 3, in each nanostructure 21, the plurality of grooves 210 and the slit 211 extend parallel to each other in a second direction parallel to the surface 21LS and intersecting the first direction, and lengths of the plurality of grooves 210 and the slit 211 in the second direction are equal to a size of the nanostructure 21 in the second direction.

In some embodiments, in each nanostructure 21, the plurality of grooves 210 have a same depth in the third direction.

In some embodiments, in any two of the plurality of nanostructures 21, pitches of the grooves 210 in the first direction are different from each other, widths of the grooves 210 in the first direction are different from each other, and the slits 211 of the two nanostructures 21 have a same width in the first direction.

The nanostructure layer 2 according to the embodiment of the present disclosure functions based on the following principle. Plasmas at an interface between the grooves 210 of the nanostructure 21 and the air oscillate and are coupled with light incident on the nanostructure 21, thereby producing Surface Plasmon Polariton (SPP). The SPP is a surface wave that propagates along the surface of the nanostructure 21 and interferes with the incident polarized light at the slit 211, so that monochromatic light having a specific wavelength can exit from the nanostructure 21. A wavelength of light exiting from the nanostructure 21 may be adjusted by adjusting an angle at which the light is incident on the nanostructure 21, thereby achieving color filtering of light. In some embodiments, as shown in FIG. 1, light is incident on the nanostructures 21 in different sub-pixel regions 4 at different angles, so that light exiting from the nanostructures 21 in different sub-pixel regions 4 has different wavelengths, i.e., exhibits different colors.

In some embodiments, each nanostructure 21 has a width of 5 μm in the first direction. In some embodiments, the width of each of the plurality of grooves 210 in the first direction is in a range from 50 nm to 400 nm, and the depth of each of the plurality of grooves 210 in the third direction is 100 nm. In some embodiments, a width of the slit in the first direction is 100 nm.

The slits 211 of different nanostructures 21 may have different widths.

In some embodiments, as shown in FIGS. 1-3, ten grooves 210 are provided in one nanostructure 21, and each of both sides of the slit 211 are provided with five grooves 210. It should be noted that the number, distribution and pitch of the grooves 210 in the nanostructures 21 of the sub-pixel regions for emitting light of different colors may be set to be different from each other, and may be set according to the wavelengths of the emitted light.

Figure 4:
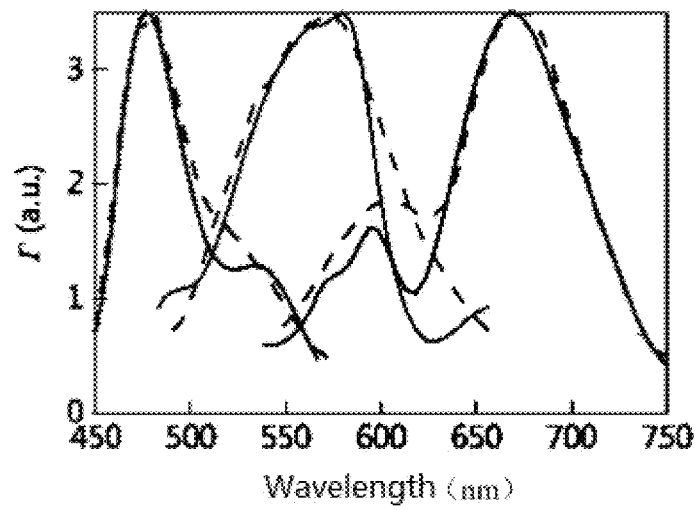
FIG. 4 illustrates calculated spectral curves of red, green and blue light exiting from a nanostructure layer.
Figure 5:
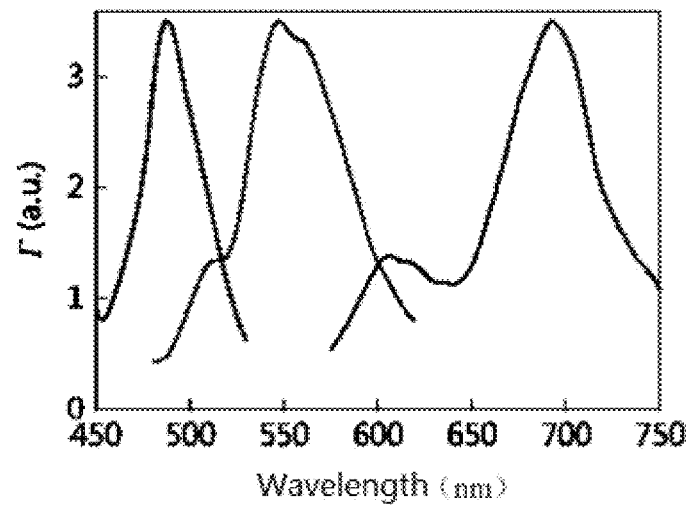
FIG. 5 illustrates measured spectral curves of red, green and blue light exiting from a nanostructure layer.

In some embodiments, as shown in FIG. 1, the sub-pixel regions 4 for emitting light of different colors are arranged in the first direction, and thus the nanostructures 21 corresponding to the sub-pixel regions 4 are arranged in the first direction. In some embodiments, as shown in FIG. 1, one pixel region 6 includes three sub-pixel regions 41, 42 and 43 for emitting light of three colors of red, green and blue, respectively, and the three sub-pixel regions 41, 42 and 43 may respectively emit light of three colors of red, green and blue by using the nanostructure layer 2 and the light guide structure layer 3, so that the pixel region realizes color display. In some embodiments, as shown in FIG. 1, the sub-pixel region 41 is for emitting red light, the sub-pixel region 42 is for emitting green light, and the sub-pixel region 43 is for emitting blue light, but the present disclosure is not limited thereto. In this case, calculated spectra of red light, green light, and blue light exiting from the nanostructure layer 2 are substantially the same as measured spectra of red light, green light, and blue light exiting from the nanostructure layer 2, and the calculated spectra and the measured spectra of red light, green light, and blue light exiting from the nanostructure layer 2 are shown in FIGS. 4 and 5, respectively. As shown in FIG. 4, the spectra of red light, green light, and blue light calculated according to light interference model are indicated by solid lines, and the spectra of red light, green light, and blue light calculated according to the Finite Difference Time Domain (FDTD) method are indicated by dashed lines. The measured spectra of red light, green light, and blue light are indicated by solid lines in FIG. 5.

In some embodiments, as shown in FIG. 1, the width of one sub-pixel region 4 in the first direction is substantially equal to the width of one nanostructure 21 in the first direction, i.e., the width of one sub-pixel region 4 in the first direction is one time the width of one nanostructure 21 in the first direction, but the present disclosure is not limited thereto.

In some embodiments, the width of one sub-pixel region 4 in the first direction may be n times the width of one nanostructure 21 in the first direction, 2≤n≤500. In this case, one sub-pixel region 4 may correspond to multiple nanostructures 21.

In some embodiments, the sub-pixel regions 4 are arranged in an array, and the size of the nanostructures 21 in the second direction is equal to a size of the array of the sub-pixel regions 4 in the second direction.

In some embodiments, as shown in FIG. 1, a transparent conductive layer 5 is disposed between the base 1 and the nanostructure layer 2, and the nanostructure layer 2 is disposed on a side of the transparent conductive layer 5 distal to the base 1. The nanostructure layer 2 may be formed more easily by using the transparent conductive layer 5.

In some embodiments, the nanostructure layer 2 includes silver. In some embodiments, the transparent conductive layer 5 includes indium tin oxide.

In the light guide structure layer 3 according to the embodiment of the present disclosure, as shown in FIG. 1, light exiting surfaces of the light guide sub-portions of each light guide structure 31 in different sub-pixel regions facing the nanostructure layer 2 have different angles with respect to the surface 21LS, such that light exiting from the sub-pixel regions corresponding to the light guide sub-portions to the outside of the color filter substrate have different colors from each other. That is, light incident on the nanostructure layer 2 at different angles is converted into light having different wavelengths, and light incident on the nanostructure layer 2 at a predetermined angle is converted into light having a predetermined wavelength. For example, as shown in FIG. 1, the light guide sub-portions 310, 311, and 312 of the light guide structure 31 correspond to the sub-pixel regions 41, 42, and 42, respectively, and light incident on the nanostructure layer 2 from the light guide sub-portions 310, 311, and 312 has different predetermined incident angles, respectively, so that light exiting from the nanostructures 21 respectively corresponding to the sub-pixel regions 41, 42, and 42 has different predetermined wavelengths.

In some embodiments, the light guide structure layer 3 includes polymethyl methacrylate (PMMA), but the present disclosure is not limited thereto. In some embodiments, the light guide structure layer 3 may include cycloolefin thermoplastic resin (for example, of Zeonor) or Polycarbonate (PC).

Figure 6:
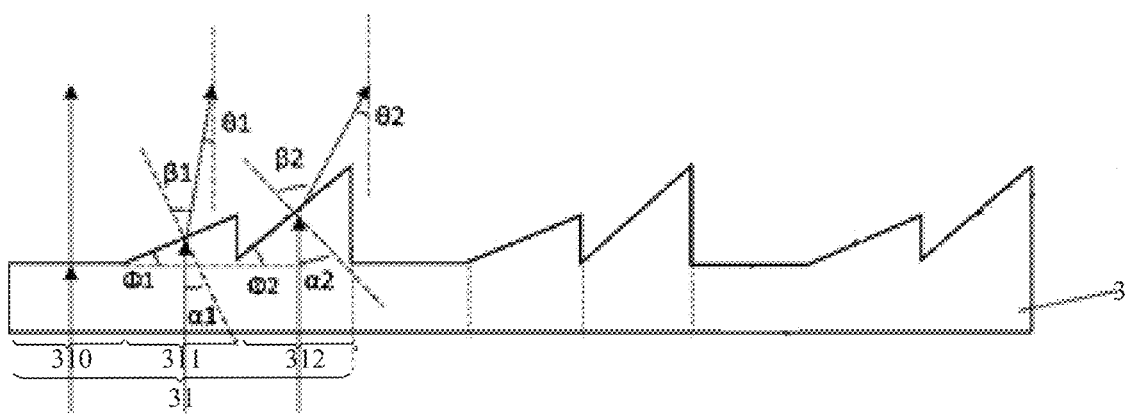
FIG. 6 is a schematic diagram illustrating that an optical path is changed through a light guide structure layer of a color filter substrate according to an embodiment of the present disclosure.

In some embodiments, as shown in FIGS. 1 and 6, the pixel region 6 includes a red sub-pixel region 41, a green sub-pixel region 42, and a blue sub-pixel region 43, the light guide structure 31 includes a first light guide sub-portion 310, a second light guide sub-portion 311, and a third light guide sub-portion 312, the first light guide sub-portion 310, the second light guide sub-portion 311, and the third light guide sub-portion 312 correspond to the red sub-pixel region 41, the green sub-pixel region 42, and the blue sub-pixel region 43, respectively, an angle between the light exiting surface of the first light guide sub-portion 310 and the surface 21LS is 0°, an acute angle φ1 between the light exiting surface of the second light guide sub-portion 311 and the surface 21LS is 19°, and an acute angle φ2 between the light exiting surface of the third light guide sub-portion 312 and the surface 21LS is 31.9°. In this case, light is incident on the nanostructure layer 2 at different incident angles after passing through the first light guide sub-portion 310, the second light guide sub-portion 311, and the third light guide sub-portion 312, respectively, so that after passing through the nanostructure layer 2, light exiting from the red sub-pixel region 41, the green sub-pixel region 42, and the blue sub-pixel region 43 is red light, green light, and blue light, respectively.

Figure 7:
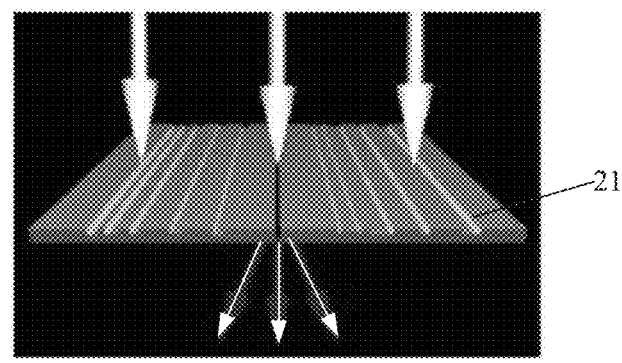
FIG. 7 is a schematic diagram illustrating that light exiting from a first light guide sub-portion is converted into red light after being incident on a nanostructure layer.
Figure 8:
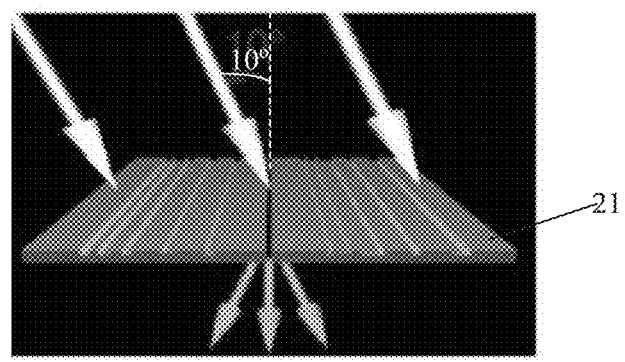
FIG. 8 is a schematic diagram illustrating that light exiting from a second light guide sub-portion is converted into green light after being incident on a nanostructure layer.
Figure 9:
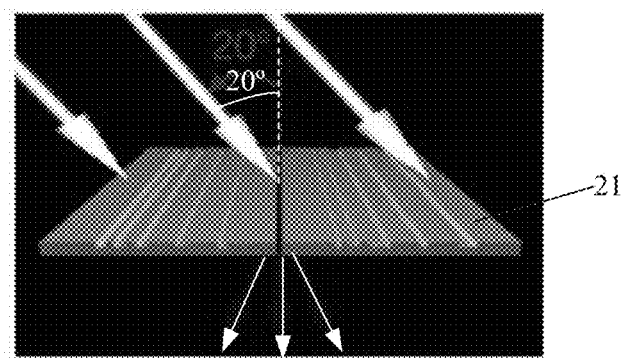
FIG. 9 is a schematic diagram illustrating that light exiting from a third light guide sub-portion is converted into blue light after being incident on a nanostructure layer.

In order that the light exiting from the red sub-pixel region 41, the green sub-pixel region 42, and the blue sub-pixel region 43 after passing through the nanostructure layer 2 is red light, green light, and blue light, respectively, it is required that an angle between the light exiting from the first light guide sub-portion 310 and a normal direction of the surface 21LS is 0°, an acute angle θ1 between the light exiting from the second light guide sub-portion 311 and the normal direction of the surface 21LS is 10°, and an acute angle θ2 between the light exiting from the third light guide sub-portion 312 and a normal direction of the surface 21LS is 20°, as shown in FIGS. 7-9.

Therefore, as shown in FIG. 1, the first light guide sub-portions 310, the second light guide sub-portions 311, and the third light guide sub-portions 312 may be provided by the following formulas (1) to (4) according to the law of refraction of light:

$$\frac{\sin\beta1}{\sin\alpha1} = \frac{n1}{n2} \quad (1)$$

$$\frac{\sin\beta2}{\sin\alpha2} = \frac{n1}{n2} \quad (2)$$

$$\theta1 = \beta1 - \alpha1 = \arcsin\left(\frac{n1}{n2} * \sin\phi1\right) - \phi1 \quad (3)$$

$$\theta2 = \beta2 - \alpha2 = \arcsin\left(\frac{n1}{n2} * \sin\phi2\right) - \phi2 \quad (4)$$

As shown in FIGS. 1 and 6, an angle between light incident on the second light guide sub-portion 311 and a normal of the light exiting surface of the second light guide sub-portion 311 is α1, and an angle between light exiting from the second light guide sub-portion 311 and the normal of the light exiting surface of the second light guide sub-portion 311 is β1, an angle between light incident on the third light guide sub-portion 312 and a normal of the light exiting surface of the third light guide sub-portion 312 is α2, and an angle between light exiting from the third light guide sub-portion 312 and the normal of the light exiting surface of the third light guide sub-portion 312 is β2. As shown in FIGS. 1 and 6, α1=φ1, and α2=φ2. In addition, a refractive index n1 of light in optical acrylic resin is generally 1.49, and a refractive index n2 of light in air is generally 1. Therefore, in order that θ1=10° and θ2=20°, it may be calculated according to the formulas (1) to (4) that the acute angle φ1 between the light exiting surface of the second light guide sub-portion 311 and the surface 21LS is 19°, and the acute angle φ2 between the light exiting surface of the third light guide sub-portion 312 and the surface 21LS is 31.9°. Therefore, the inclination angles of the light exiting surfaces of the second light guide sub-portion 311 and the third light guide sub-portion 312 of the light guide structure 31 with respect to the surface 21LS may be set to φ1=19° and φ2=31.9°.

As described above, in the embodiments of the present disclosure, the light guide structure layer 3 includes polymethyl methacrylate, but the present disclosure is not limited thereto. It should be noted that, regardless of material of the light guide structure layer 3, in order that the light exiting from the red sub-pixel region 41, the green sub-pixel region 42, and the blue sub-pixel region 43 is respectively red, green and blue light after the incident light passes through the nanostructure layer 2, it is required that the angle between the light exiting from the first light guide sub-portion 310 and the normal direction of the surface 21LS is 0°, the acute angle θ1 between the light exiting from the second light guide sub-portion 311 and the normal direction of the surface 21LS is 10°, and the acute angle θ2 between the light exiting from the third light guide sub-portion 312 and the normal direction of the surface 21LS is 20°. Therefore, when the light guide structure layer 3 is made of other materials, the angles between the light exiting surfaces of the first light guide sub-portion 310, the second light guide sub-portion 311, and the third light guide sub-portion 312 and the surface 21LS may be adjusted according to the formula (1) to the formula (4) such that the angle between the light exiting from the first light guide sub-portion 310 and the normal direction of the surface 21LS is 0°, the angle θ1 is 10°, and the angle θ2 is 20°.

In some embodiments, the color filter substrate according to an embodiment of the present disclosure further includes a black matrix 7, a planarization layer 8, and a spacer 9 disposed on a side of the base 1 distal to the color filter structure. The black matrix 7 is configured to shield opaque regions, the planarization layer 8 is configured to planarize a surface of the color filter substrate facing the array substrate, and the spacer 9 is configured to support the color filter substrate and the array substrate. An orthographic projection of the spacer 9 on the base 1 overlaps an orthographic projection of the black matrix 7 on the base 1.

An embodiment of the present disclosure further provides a method of manufacturing the above color filter substrate. The method includes: forming the nanostructure layer 2 and the light guide structure layer 3 on the base 1.

In some embodiments, as shown in FIGS. 10-16 and 17, forming the nanostructure layer 2 on the base 1 may include the following steps S01 to S07.

Figure 10:
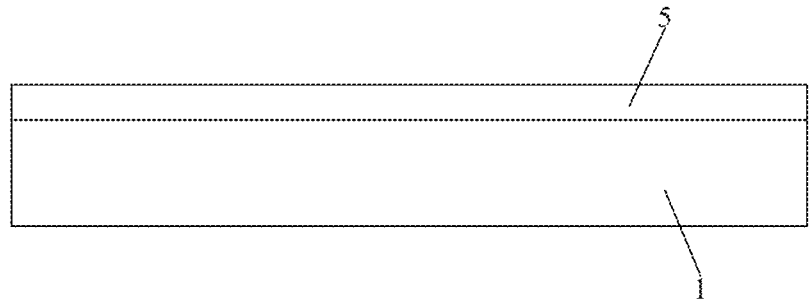
FIGS. 10-16 are schematic diagrams illustrating stages of a method of manufacturing a color filter substrate according to an embodiment of the present disclosure.
Figure 17:
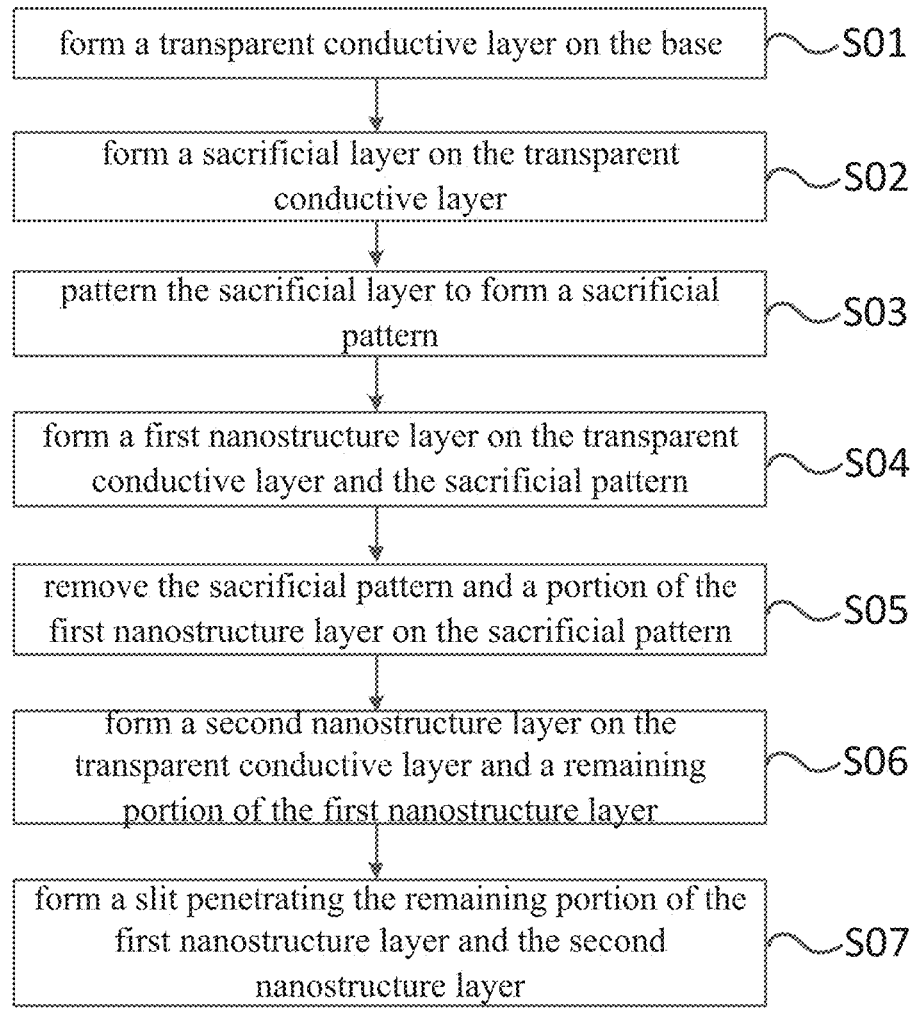
FIG. 17 illustrates a flow chart of forming a nanostructure layer in a method of manufacturing a color filter substrate according to an embodiment of the present disclosure.

In step S01, as shown in FIGS. 10 and 17, the transparent conductive layer 5 is formed on the base 1.

In some embodiments, the transparent conductive layer 5 having a thickness ranging from 10 nm to 20 nm is formed, by a magnetron sputtering process, on the base 1 after being cleaned. The transparent conductive layer 5 may include indium tin oxide.

Figure 11:
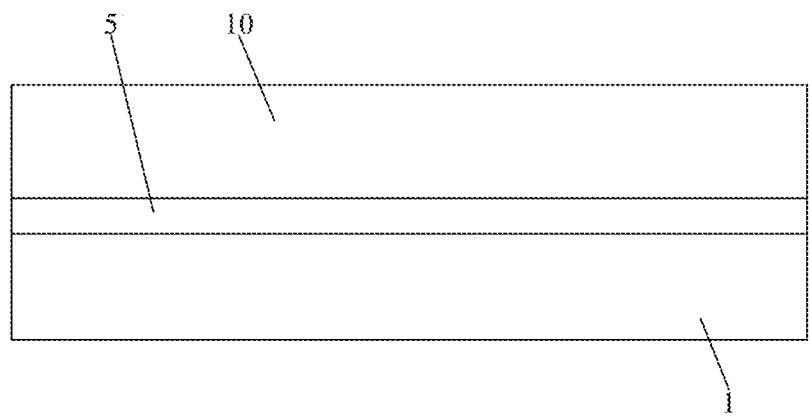
Figure 12:
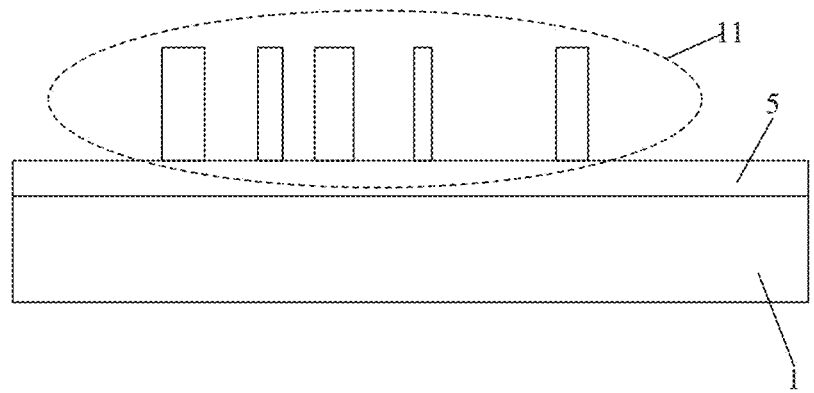

In step S02, as shown in FIGS. 11 and 17, a sacrificial layer 10 is formed on the transparent conductive layer 5. In step S03, as shown in FIGS. 12 and 17, the sacrificial layer 10 is patterned to form a sacrificial pattern 11.

In some embodiments, the sacrificial layer 10 (e.g., including polymethyl methacrylate) having a thickness of 100 nm is formed on a surface of the transparent conductive layer 5 by spinning. Then, the sacrificial layer 10 is exposed using an electron beam of 100 KeV and a mask, a development process is performed using methyl isobutyl ketone for 60 s after the exposure is completed, and a cleaning process is performed using isopropyl alcohol for 30 s after the development is completed, such that the sacrificial pattern 11 is obtained.

Figure 13:
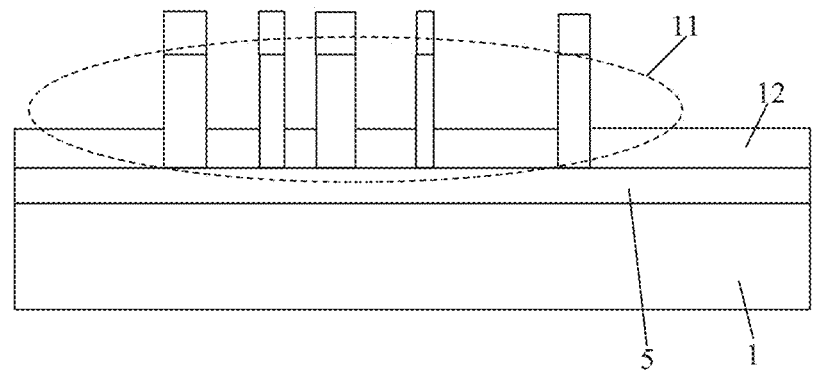
Figure 14:
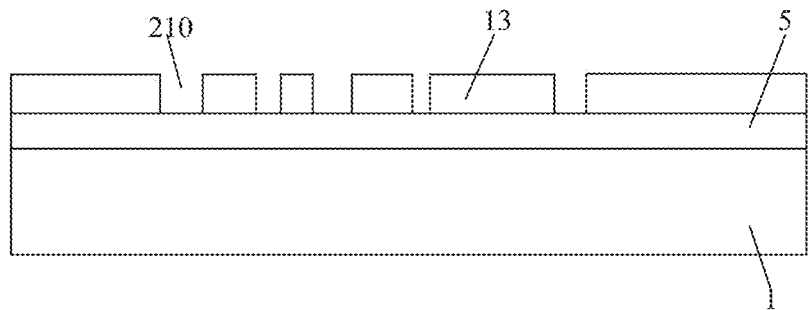
Figure 15:
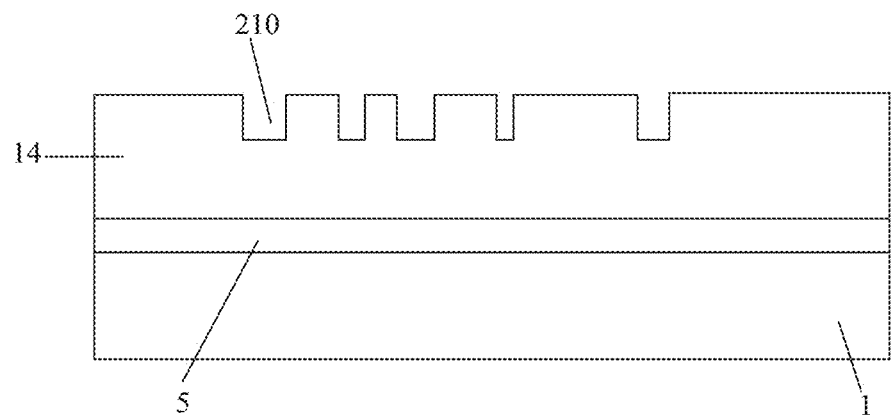

In step S04, as shown in FIGS. 13 and 17, a first nanostructure layer 12 is formed on the transparent conductive layer 5 and the sacrificial pattern 11. In step S05, as shown in FIGS. 14 and 17, the sacrificial pattern 11 and a portion of the first nanostructure layer 12 on the sacrificial pattern 11 are removed, thereby obtaining the remaining portion 13 of the first nanostructure layer. In step S06, as shown in FIGS. 15 and 17, a second nanostructure layer is formed on the transparent conductive layer 5 and the remaining portion 13 of the first nanostructure layer.

In some embodiments, the first nanostructure layer 12 (e.g., including silver) having a thickness of 100 nm is formed on the sacrificial pattern 11 using an electronic beam evaporation process. Then, the base 1 on which the first nanostructure layer 12 has been formed is soaked in acetone for 12 h to remove the sacrificial pattern 11 and the portion of the first nanostructure layer 12 on the sacrificial pattern 11. Then, the second nanostructure layer (e.g., including silver) having a thickness of 150 nm is formed on the transparent conductive layer 5 and the remaining portion 13 of the first nanostructure layer using the electronic beam evaporation process, thereby obtaining a nanostructure layer 14 having grooves 210.

Figure 16:
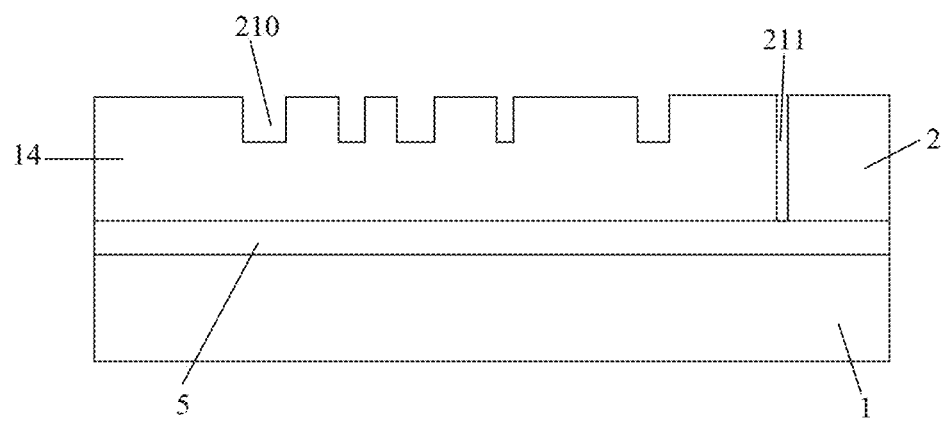

In step S07, as shown in FIGS. 16 and 17, the slit 211 penetrating the remaining portion 13 of the first nanostructure layer and the second nanostructure layer is formed.

In some embodiments, the slit 211 having a width of 100 nm is formed by etching the remaining portion 13 of the first nanostructure layer and the second nanostructure layer using a Focused Ion Beam (FIB) Milling process to form the nanostructure layer 2.

In the embodiments of the present disclosure, the light guide structure layer 3 may be formed by any known and suitable process (for example, a dry etching process).

In addition, the method of manufacturing the color filter substrate according to the embodiment of the present disclosure may further include forming the black matrix 7, the planarization layer 8 and the spacer 9 as shown in FIG. 1 on the side of the base 1 distal to the nanostructure layer 2 by using any known and suitable process.

In the method of manufacturing the color filter substrate according to the embodiment of the present disclosure, color filter materials for different colors are replaced with the color filter structure including the nanostructure layer 2 and the light guide structure layer 3 to realize color filtering of light, and thus the color gamut can be improved without sacrificing the light transmittance. In addition, the color filter structure does not include ion impurities, so that the display afterimage caused by the direct current bias electric field due to the ion impurities can be eliminated or alleviated.

An embodiment of the present disclosure further provides a display panel. The display panel includes the color filter substrate according to the embodiments of the present disclosure.

Figure 18:
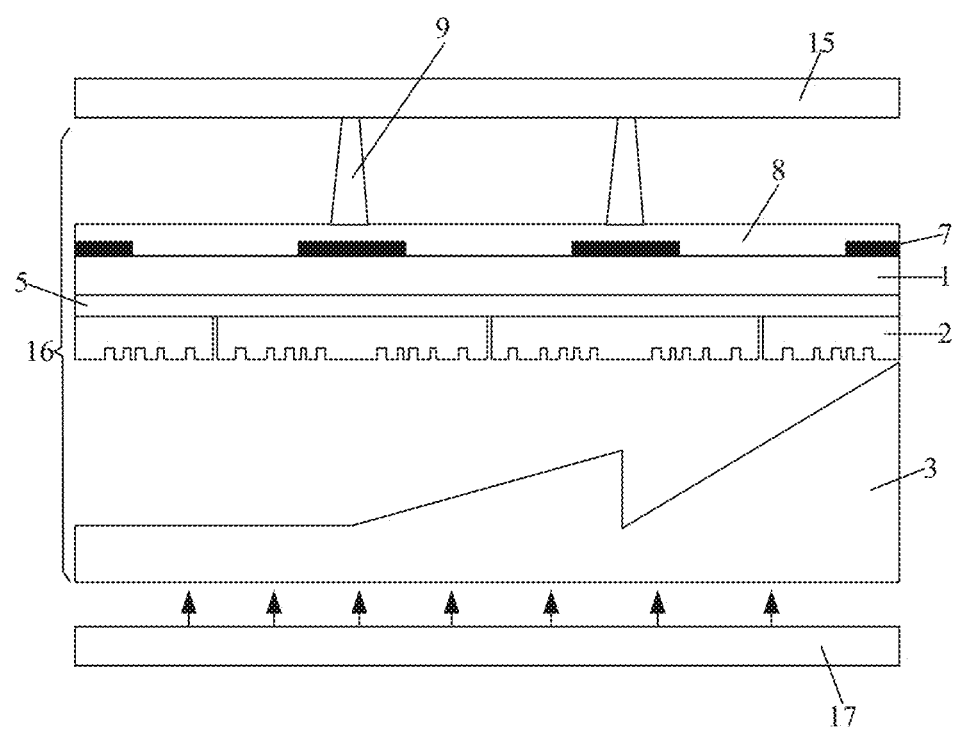
FIG. 18 illustrates a schematic cross-sectional view of a structure of a display panel according to an embodiment of the present disclosure.
Figure 19:
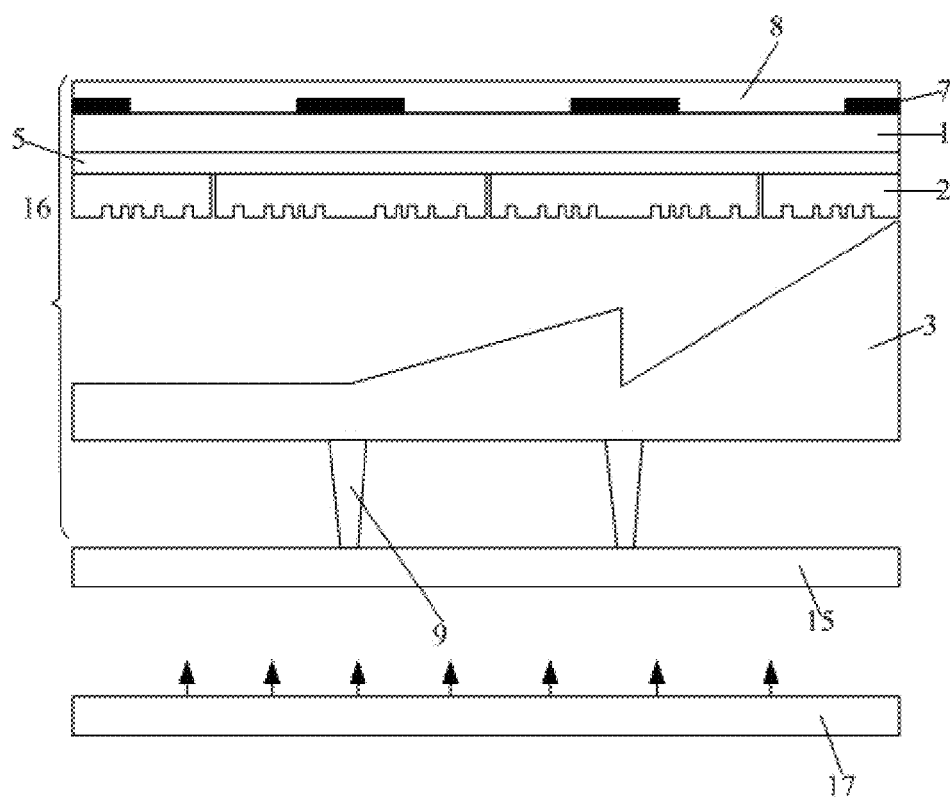
FIG. 19 illustrates a schematic cross-sectional view of a structure of a display panel according to an embodiment of the present disclosure.

In some embodiments, as shown in FIGS. 18 and 19, the display panel according to the embodiment of the present disclosure may further include an array substrate 15.

In some embodiments, as shown in FIG. 18, the array substrate 15 may be disposed on a side of the base 1 of the color filter substrate 16 distal to the light guide structure layer 3, and the color filter substrate 16 and the array substrate 15 are supported by the spacer 9, but the present disclosure is not limited thereto.

In some embodiments, as shown in FIG. 19, the array substrate 15 may be disposed on a side of the base 1 of the color filter substrate 16 proximal to the light guide structure layer 3. In this case, the spacer 9 is disposed on a side of the light guide structure layer 3 distal to the base 1, and supports the color filter substrate 16 and the array substrate 15.

In some embodiments, as shown in FIGS. 18 and 19, the display panel according to the embodiments of the present disclosure may further include a backlight source 17. The backlight source 17 is configured to provide collimated light.

In some embodiments, as shown in FIG. 18, the backlight source 17 may be disposed on a side of the color filter substrate 16 distal to the array substrate 15, but the present disclosure is not limited thereto. In some embodiments, as shown in FIG. 19, the backlight source 17 may be disposed on a side of the color filter substrate 16 proximal to the array substrate 15, and the array substrate 15 is located between the backlight source 17 and the color filter substrate 16.

The display panel includes the color filter substrate according to the embodiments of the present disclosure, and thus the display effect of the display panel is improved.

It will be appreciated that the above embodiments are merely exemplary embodiments for the purpose of illustrating the principle of the present disclosure, and the present disclosure is not limited thereto. Various modifications and improvements can be made by a person having ordinary skill in the art without departing from the spirit and essence of the present disclosure. Accordingly, all of the modifications and improvements also fall into the protection scope of the present disclosure.

What is claimed is:

1. A color filter substrate, comprising:
a base; and
a color filter structure on a side of the base,
wherein the color filter substrate comprises a plurality of pixel regions, and each of the plurality of pixel regions comprises a plurality of sub-pixel regions;
the color filter structure comprises a nanostructure layer and a light guide structure layer, the light guide structure layer is on a side of the nano structure layer distal to the base, the light guide structure layer comprises a plurality of light guide structures, each of the plurality of light guide structures is in a corresponding one of the plurality of pixel regions, each of the plurality of light guide structures comprises a plurality of light guide sub-portions, each of the plurality of light guide sub-portions is in a corresponding one of the plurality of sub-pixel regions of the pixel region in which the light guide sub-portion is located, the nanostructure layer comprises a plurality of non-periodic nanostructures, each of the plurality of sub-pixel regions corresponds to at least one of the non-periodic nanostructures, and each of the plurality of non-periodic nanostructures is in a corresponding one of the plurality of sub-pixel regions; and
each of the plurality of light guide sub-portions in a same pixel region is configured such that light incident respectively on the plurality of light guide sub-portions in the same pixel region exits at different angles and enters into the at least one non-periodic nanostructure in the sub-pixel region in which the light guide sub-portion is located, and each non-periodic nanostructure is configured to enable coupling and interference of light incident thereon such that light exiting from the sub-pixel region in which the non-periodic nanostructure is located has a predetermined color.

2. The color filter substrate of claim 1, wherein each non-periodic nanostructure comprises: a plurality of grooves in the non-periodic nanostructure and recessed from a surface of the non-periodic nano structure distal to the base and arranged in a first direction parallel to the surface of the non-periodic nanostructure, and a slit penetrating the non-periodic nanostructure in a third direction perpendicular to the surface of the non-periodic nano structure, each groove being recessed from the surface of the non-periodic nanostructure in the third direction by a depth less than a thickness of the non-periodic nanostructure in the third direction, and in each non-periodic nanostructure, widths of the plurality of grooves in the first direction are non-periodic and pitches of the plurality of grooves in the first direction are non-periodic.

3. The color filter substrate of claim 2, wherein
in each non-periodic nanostructure, the widths of the plurality of grooves in the first direction are different from each other, the pitches of the plurality of grooves in the first direction are different from each other, and the width of each of the plurality of grooves in the first direction is different from a width of the slit in the first direction.

4. The color filter substrate of claim 2, wherein
in each non-periodic nanostructure, the plurality of grooves and the slit extend parallel to each other in a second direction parallel to the surface of the non-periodic nanostructure and intersecting the first direction, and lengths of the plurality of grooves and the slit in the second direction are equal to a size of the non-periodic nanostructure in the second direction.

5. The color filter substrate of claim 2, wherein
in each non-periodic nanostructure, the plurality of grooves have a same depth in the third direction.

6. The color filter substrate of claim 3, wherein in any two non-periodic nanostructures of the plurality of non-periodic nanostructures, pitches of the plurality of grooves in the first direction are different from each other, widths of the plurality of grooves in the first direction are different from each other, and the slits of the two non-periodic nanostructures have a same width in the first direction.

7. The color filter substrate of claim 4, wherein in each non-periodic nanostructure, the non-periodic nanostructure has a width of 5 μm in the first direction.

8. The color filter substrate of claim 4, wherein in each non-periodic nanostructure, the width of each of the plurality of grooves in the first direction is in a range from 50 nm to 400 nm, and the depth of each of the plurality of grooves in the third direction is 100 nm.

9. The color filter substrate of claim 4, wherein in each non-periodic nanostructure, a width of the slit in the first direction is 100 nm.

10. The color filter substrate of claim 2, wherein the plurality of sub-pixel regions in each pixel region are arranged in the first direction, and the plurality of non-periodic nanostructures are arranged in the first direction.

11. The color filter substrate of claim 10, wherein a width of one sub-pixel region in the first direction is 1 or n times a width of one non-periodic nanostructure in the first direction, n being greater than or equal to 2 and less than or equal to 500.

12. The color filter substrate of claim 10, wherein the plurality of sub-pixel regions of the plurality of pixel regions are arranged in an array, and a size of the plurality of non-periodic nanostructures in the second direction is equal to a size of the array of the plurality of sub-pixel regions of the plurality of pixel regions in the second direction.

13. The color filter substrate of claim 2, wherein a transparent conductive layer is between the base and the nanostructure layer, and the nanostructure layer is on a side of the transparent conductive layer distal to the base.

14. The color filter substrate of claim 1, wherein light exiting surfaces of the plurality of light guide sub-portions of each light guide structure facing the nanostructure layer have different angles with respect to a first surface of the nanostructure layer distal to the base, such that light exiting from the plurality of sub-pixel regions corresponding to the plurality of light guide sub-portions to the outside of the color filter substrate have different colors from each other.

15. The color filter substrate of claim 14, wherein each pixel region comprises a red sub-pixel region, a green sub-pixel region and a blue sub-pixel region;

the light guide structure corresponding to the pixel region comprises a first light guide sub-portion, a second light guide sub-portion and a third light guide sub-portion, and the first light guide sub-portion, the second light guide sub-portion and the third light guide sub-portion are in the red sub-pixel region, the green sub-pixel region and the blue sub-pixel region, respectively; and an angle between the light exiting surface of the first light guide sub-portion and the first surface is 0°, an acute angle between the light exiting surface of the second light guide sub-portion and the first surface is 19°, and an acute angle between the light exiting surface of the third light guide sub-portion and the first surface is 31.9°.

16. The color filter substrate of claim 1, wherein the non-periodic nanostructure comprises silver.

17. The color filter substrate of claim 1, wherein the light guide structure comprises polymethyl methacrylate.

18. A display panel, comprising: the color filter substrate of claim 1, and an array substrate.

19. A method of manufacturing a color filter substrate, comprising:

forming a nanostructure layer and a light guide structure layer on a base, the light guide structure layer being on a side of the nanostructure layer distal to the base, wherein the color filter substrate comprises a plurality of pixel regions, and each pixel region comprises a plurality of sub-pixel regions;

the light guide structure layer comprises a plurality of light guide structures, each of the plurality of light guide structures is in a corresponding one of the plurality of pixel regions, each of the plurality of light guide structures comprises a plurality of light guide sub-portions, each of the plurality of light guide sub-portions is in a corresponding one of the plurality of sub-pixel regions of the pixel region in which the light guide sub-portion is located, the nanostructure layer comprises a plurality of non-periodic nanostructures, each of the plurality of sub-pixel regions corresponds to at least one of the non-periodic nanostructure, and each of the plurality of non-periodic nanostructures is in a corresponding one of the plurality of sub-pixel regions; and each of the plurality of light guide sub-portions in a same pixel region is configured such that light incident respectively on the plurality of light guide sub-portions in the same pixel region exits at different angles and enters into the at least one non-periodic nanostructure in the sub-pixel region in which the light guide sub-portion is located, and each non-periodic nanostructure is configured to enable coupling and interference of light incident thereon such that light exiting from the sub-pixel region in which the non-periodic nanostructure is located has a predetermined color.

20. The method of claim 19, wherein forming the nanostructure layer comprises:

forming a transparent conductive layer on the base;

forming a sacrificial layer on the transparent conductive layer;

patterning the sacrificial layer to form a sacrificial pattern;

forming a first nanostructure layer on the transparent conductive layer and the sacrificial pattern;

removing the sacrificial pattern and a portion of the first nanostructure layer on the sacrificial pattern;

forming a second nano structure layer on the transparent conductive layer and a remaining portion of the first nanostructure layer;

forming a slit penetrating the remaining portion of the first nanostructure layer and the second nano structure layer.

* * * * *